US005869002A

United States Patent [19]
Limon et al.

[11] Patent Number: 5,869,002

[45] Date of Patent: Feb. 9, 1999

[54] ANALYSIS CARD

[75] Inventors: Bernard Jean-Marie Limon, Rignat, France; Fabienne Marquis-Weible, Neuchatel; Philippe Renaud, Saint-Sulpice, both of Switzerland

[73] Assignee: Bio Merieux, Marcy L'Etoile, France

[21] Appl. No.: 913,726

[22] PCT Filed: Feb. 12, 1997

[86] PCT No.: PCT/IB97/00112

§ 371 Date: Nov. 14, 1997

§ 102(e) Date: Nov. 14, 1997

[87] PCT Pub. No.: WO97/28899

PCT Pub. Date: Aug. 14, 1997

[30] Foreign Application Priority Data

Feb. 12, 1996 [FR] France .................................. 96 01984

[51] Int. Cl.[6] ................................ B01L 3/00; G01N 1/00

[52] U.S. Cl. ............................ 422/58; 422/103; 436/165; 436/180

[58] Field of Search ................................ 422/50, 58, 55, 422/102, 103; 436/180, 165; 220/501, 502; 206/532, 569

[56] References Cited

U.S. PATENT DOCUMENTS

| | | | |
|---|---|---|---|
| 5,039,490 | 8/1991 | Marsoner et al. | 422/82.01 |
| 5,137,808 | 8/1992 | Ullman et al. | 422/56 X |
| 5,362,654 | 11/1994 | Pouletty | 436/518 |
| 5,364,591 | 11/1994 | Green et al. | 422/58 |
| 5,411,065 | 5/1995 | Meador et al. . | |
| 5,472,671 | 12/1995 | Nilsson et al. | 422/102 |
| 5,652,149 | 7/1997 | Mileaf et al. | 426/518 |

FOREIGN PATENT DOCUMENTS

| | | |
|---|---|---|
| A 0-583833 | 2/1994 | European Pat. Off. . |
| A 0-594259 | 4/1994 | European Pat. Off. . |

*Primary Examiner*—Jeffrey Snay
*Attorney, Agent, or Firm*—Oliff & Berridge, PLC

[57] ABSTRACT

An analysis card containing two mutually separate chambers separated by a frangible partition that is arranged within the card and made of an absorbent and preferably plastic material for absorbing light energy having at least a predetermined wavelength, and converting it into heat energy capable of at least locally removing the material.

9 Claims, 3 Drawing Sheets

ANALYSIS CARD

Figure 1:
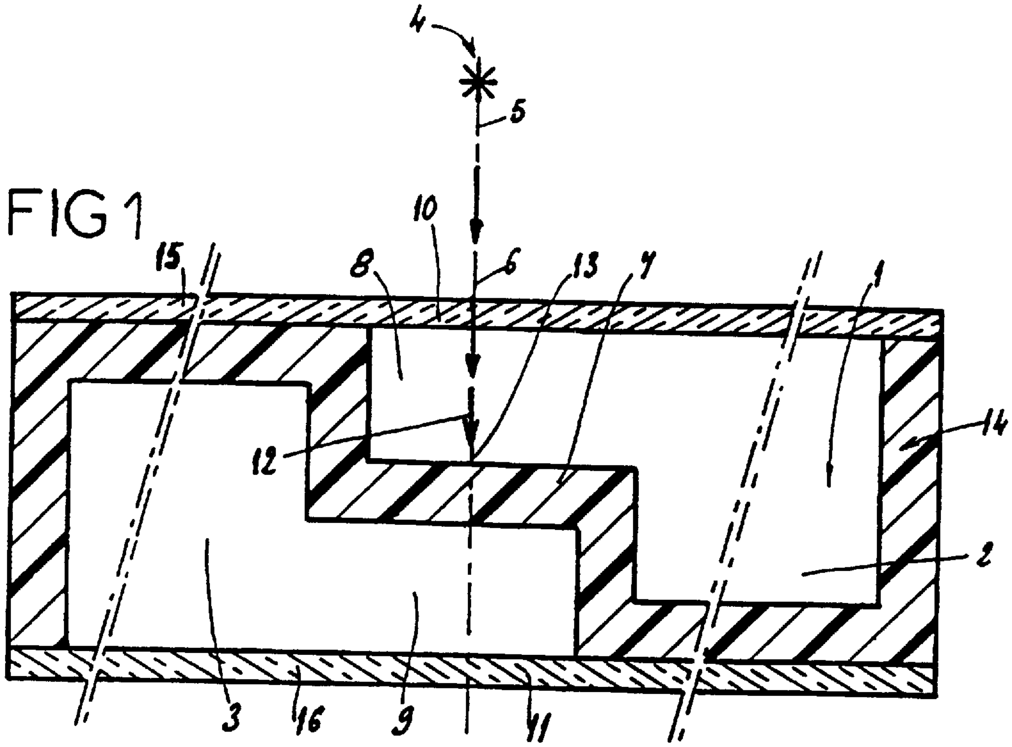

The present invention relates to the processing of an analysis card.

The term "analysis" is intended to mean any method or process making it possible to identify, separate, isolate, determine, detect or quantify a material, a product, a substance, or a compound, referred to under the generic expression "analyte", on the basis of a specimen or sample to be analyzed, possibly diluted beforehand with any suitable medium, for example a solvent. The analyte under examination may be of chemical, biochemical or else biological nature, for example an antigen or an antibody in the latter case.

The term "analysis card" is intended to mean any device, module or system which is internally arranged in such a way as to carry out the various processes or reactions needed for identification, separation, detection or quantification of the analyte, by means of various treatments, in particular within said card, or manipulations of the analysis card, for example automatically. An analysis card of this type, well-known to the person skilled in the art, constitutes an assembly which is closed off from the outside or its immediate environment, obviously with the exception of any passages or equivalent means which make it possible, in particular and initially, to introduce the specimen or sample to be analyzed. An analysis card of this type contains the physicochemical, chemical, biochemical or biological reagent or reagents, distributed and held in the card, in accordance with the path of the specimen to be analyzed, and the reaction processes or reactions to be carried out in order to perform the analysis. An analysis card as envisaged by the present invention, in general constituting a single-use device or assembly, that is to say one which is disposed of or destroyed after it has been used, comprises or incorporates in it a plurality of chambers, arranged in series and/or in parallel, one of which, for example the last one, is in particular an optical measurement chamber. These analysis cards can be made or produced using any suitable techniques, for example in one or more parts which are assembled (for example welding) with one another and are made, for example, by molding one or more identical or different plastics.

In the claims and the description, the term "chamber" denotes any enclosure or passage which receives and/or circulates any liquid, fluid or gas present in the analysis card.

The subject of the present invention is a particular analysis card, permitting an operation of establishing communication between at least two chambers which are formed in an analysis card and are initially isolated from one another, this operation being carried out remotely and without interaction or mechanical contact with the analysis card.

The present invention resides in the interaction of two essential means, namely, on the one hand, a light beam, in particular a coherent light beam, having at least one predetermined wavelength λ and a predetermined power P, which is obtained from the light source, in particular a laser, and on the other hand a structure or arrangement of an analysis card, in which at least two chambers which are isolated from one another and from the outside are formed; however, this structure is specifically designed for using this light beam to establish at least one passage between at least two chambers of said card.

More precisely, according to the present invention, the two chambers are separated from one another by a perforable partition which is arranged within said card and is made of absorbant material, in particular plastic, absorbing the light energy of the aforementioned light beam to convert it into heat energy which can at least locally remove said material; and two cavities are formed on either side of the partition and are in communication with or contained in the two chambers respectively; and a window made of a material which is transparent at least to the wavelength λ is arranged facing said partition and defines therewith one of said cavities, referred to as the incident light ray cavity.

An analysis card according to the present invention makes it possible to implement the following process, and more particularly the following steps, interacting with one another:

(a) from a light source, in particular a laser, the aforementioned light beam having a predetermined luminous power P is provided;

(b) the analysis card is arranged as defined above;

(c) the analysis card is arranged with respect to the light beam in such a way that the incidence of the light ray illuminating the perforable partition is substantially perpendicular to it;

(d) the light source is controlled or driven in such a way that the heat energy dissipated within the perforable partition does not exceed that necessary for locally removing the absorbant material, for example by melting, vaporization or sublimation, as a hole which fully perforates this partition and is of restricted or controlled radial extent.

It is clear that the light beam used according to the invention may be convergent, parallel or divergent, the essential condition being the power density of the light beam striking the perforable partition. When the light beam is parallel or divergent, suitable guide means may be provided before and/or after the beam, in order to satisfy the aforementioned essential condition.

As described in document U.S. Pat. No. 5,411,065, it has already been proposed to use a laser light beam for remotely perforating a wall. However, to date, for lack of a particular arrangement according to the present invention, it had not been possible to use the same means to establish controlled communication between two chambers within the same analysis card.

The method according to the present invention therefore allows manipulation of the analysis card, in particular automatically, which in conjunction with the light beam, in particular laser beam, leads to the perforation of any partition arranged within said card, this being while preserving the remainder or integrity of this card. Such a method therefore seems particularly suitable for contemporary analysis apparatus, operating mostly, if not exclusively, automatically.

Figure 2:
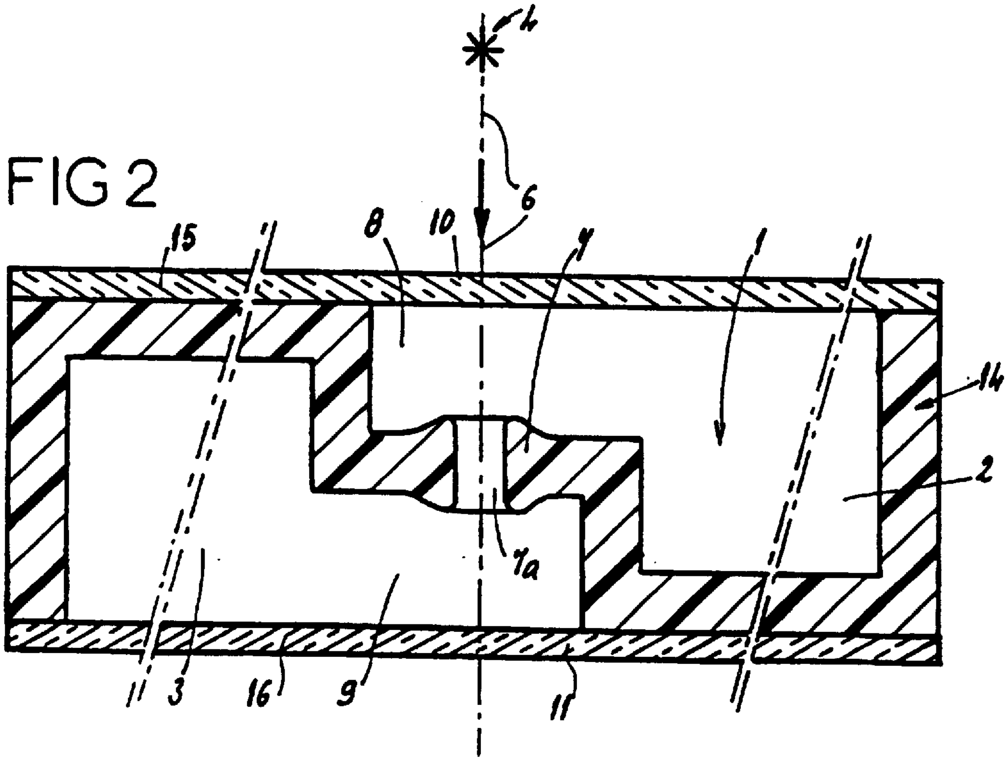
Figure 3:
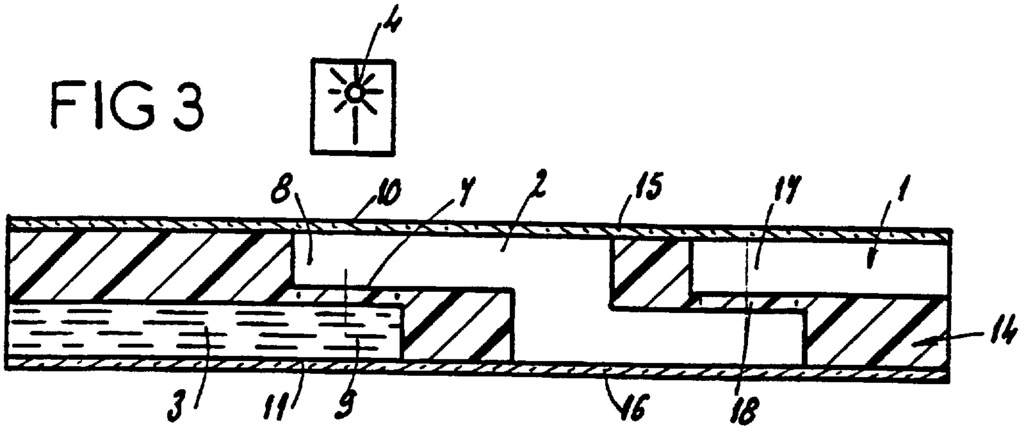
Figure 4:
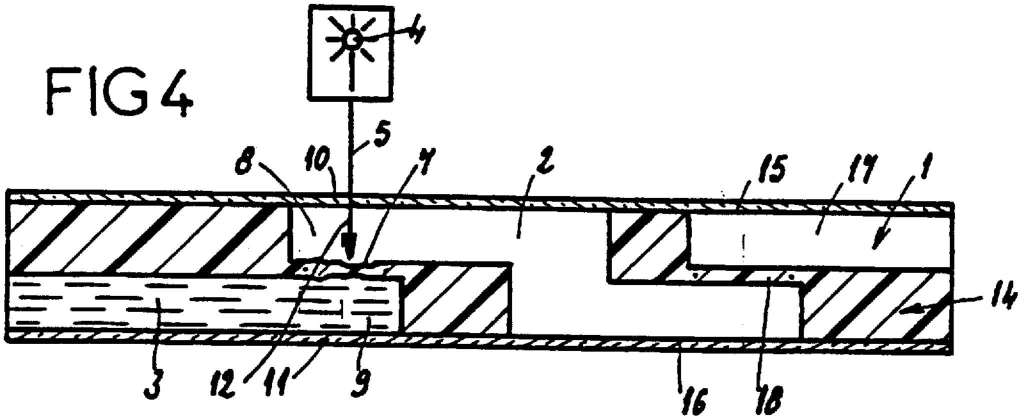
Figure 5:
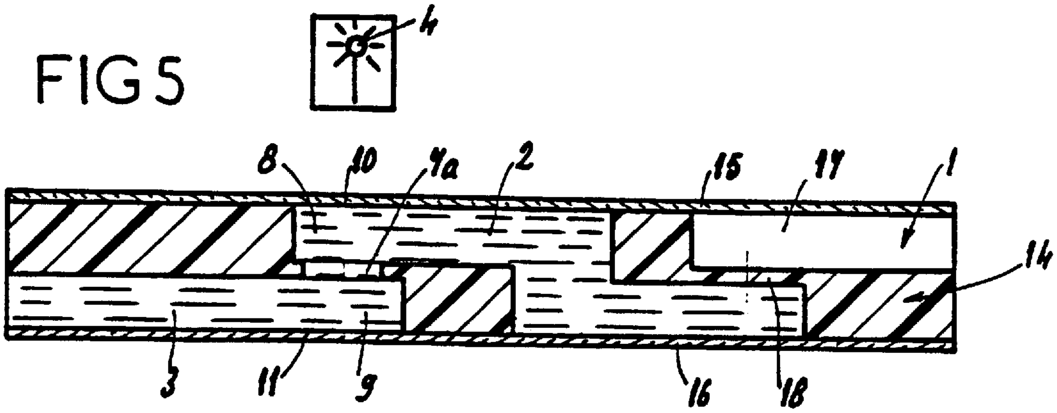
Figure 6:
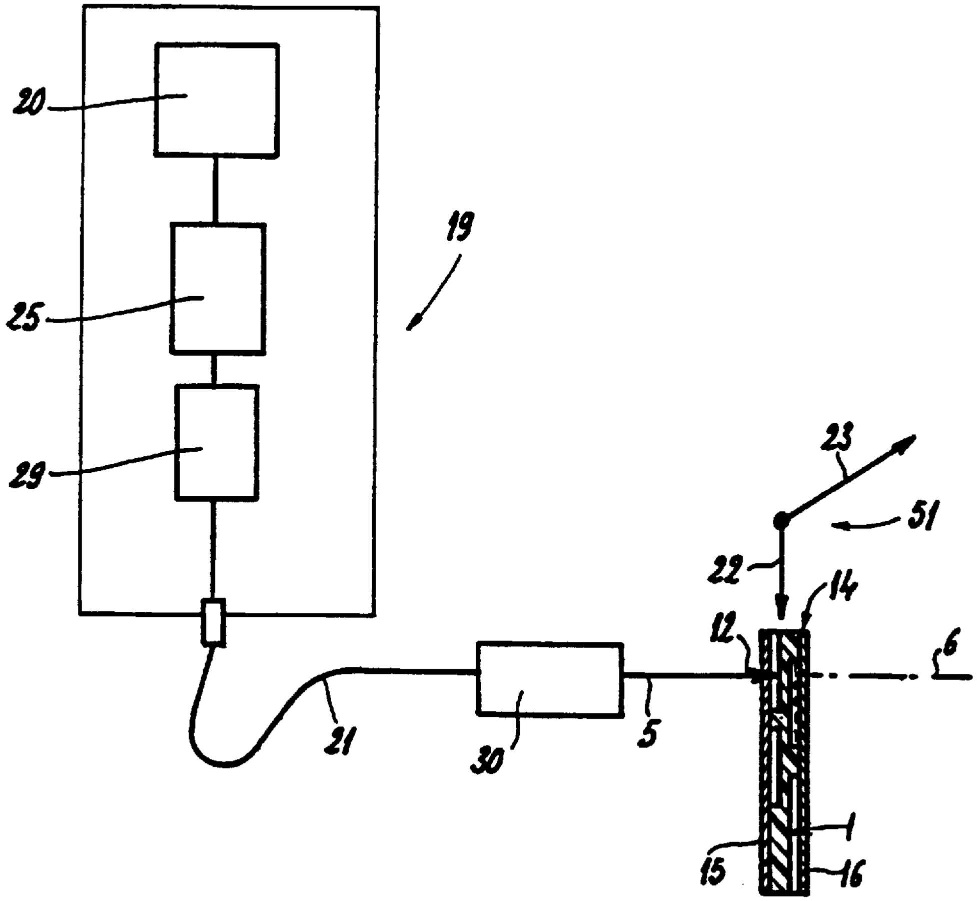

The present invention will now be described with reference to the appended drawing, in which:

FIG. 1 schematically represents a step in the method for processing an analysis card according to the invention;

FIG. 2 represents the same analysis card, as obtained after the step or operation schematically represented in FIG. 1;

FIGS. 3 to 5 respectively represent, still schematically, three successive steps in a processing method according to the invention, implemented with an analysis card made according to another embodiment of the invention;

FIG. 6 schematically represents a device for processing an analysis card according to the invention.

According to the representations in FIGS. 1 and 2, the analysis card 1 which is represented is intended for interacting with or is designed for a laser light source 4 emitting a coherent light or light beam 5 having a predetermined wavelength λ and a predetermined power P.

The analysis card 1 has a substantially flattened general shape and comprises, assembled together, for example by adhesive bonding, a flat body 14, for example a sheet of polystyrene or polycarbonate, etched or embossed beforehand, as described below, between two external walls or films 15 and 16, for example made of a plastic which is transparent to the light beam. In particular, the films 15 and 16 may be made of polypropylene, silicone or germanium.

As described below, two chambers 2 and 3 are obtained and contained within the analysis card 1 while being, on the one hand, each isolated from the outside of the card, and on the other hand initially isolated from one another. To this end, the two chambers 2 and 3 are separated from one another by a partition 7 which can be perforated by the laser light from the source 4 and is made of absorbant material, in particular of plastic, which absorbs the light energy of wavelength λ from the laser source to convert it into heat or thermal energy which can remove or eliminate the material of the partition 7, at least locally or at a point. Two cavities 8 and 9 are formed on either side of the partition 7 and are respectively in communication with the two chambers 2 and 3. Two windows 10 and 11, obtained from a material which is transparent to the wavelength λ of the laser light from the source 4, are arranged on either side of and facing the partition 7 and define therewith the two cavities 8 and 9, one 8 used for incidence of a light ray identical to or derived from the light beam 5 originating from the source 4, and the other used for emergence of the light ray after the partition 7 has been perforated.

In practice, in view of the mode of construction adopted for the analysis card 1, the arrangements described above are obtained in the following way:

- the two chambers 2 and 3, as well as the two cavities 8 and 9, are embossed or etched in the body 14; and the external walls 15 and 16 close off these chambers and cavities from the outside;
- as represented in FIGS. 1 and 2, and when the analysis card is in a horizontal position, the chamber 2 lies below the cavity 8, and the chamber 3 lies above the cavity 9; one 2 of the chambers and the cavity 8 which corresponds to it are closed off by one 15 of the external walls, and the other chamber 3 and the other cavity 9 which corresponds to it are closed off by the other external wall 16;
- the perforable partition 7 is formed in the flat body 14, and therefore in its constituent material which absorbs the light energy of wavelength λ;
- the two windows 10 and 11 are formed in the external walls 15 and 16 respectively, the constituent material of which is, as stated above, transparent to the wavelength λ.

With the analysis card described beforehand, the processing method according to the invention includes the following steps:

(a) a coherent light beam 5 having the predetermined wavelength λ and the luminous power P is provided from the laser light source 4;

(b) the analysis card 1 has the structure and arrangement which were described above, being characterized principally by the partition 7 which is arranged within the card 1 and can receive the light originating from the source 4, through the window 10, in the form of an incident light ray 12;

(c) the analysis card 1 is arranged with respect to the light beam 5 in such a way that the incidence of the light ray 12 illuminating the perforable partition 7 is substantially perpendicular to it;

(d) the light source 4 is controlled or driven in such a way that the heat energy dissipated within the partition 7 does not exceed that necessary for locally removing or eliminating the absorbant material which constitutes the partition 7, to form a hole 7*a* (cf. FIG. 2) which perforates the partition 7 and is of restricted radial extent, that is to say just sufficient to establish communication or unimpaired passage between the cavities 8 and 9, and consequently between the chambers 2 and 3.

As shown in FIG. 1, the incidence of the light ray 12 illuminating the partition 7 is at the same time substantially perpendicular to the plane of the analysis card 1 and corresponds to the reference direction 6 of the light beam 5 emitted by the source 4.

The axis of the light ray 12 illuminating the partition 7 passes through the latter substantially at its center, while forming, on either side of the through-hole 7*a*, a border which is not affected by the light energy of the laser ray.

The light ray 12 illuminating the partition 7 preferably converges to a focal point 13 at the center of or within the partition 7. However, the light ray 12 may also be either parallel or divergent, for the purposes of illuminating the partition 7, according to the desired distribution of the light energy in the impact zone of the light ray 12.

When the chamber 3 at least is filled with a liquid, preferably during steps (c) and (d), the displacement of the liquid present in the chamber 3 is controlled, for example by capillary action and/or suction, so that the cavity 9, on the other side of the perforable partition 7 from the incidence cavity 8, remains full or empty of any liquid. A cavity 9 remaining empty of any liquid at the time of illumination with the light beam 5 makes it possible, in particular, to preserve the liquid or liquids circulating in the analysis card from any premature or excessive heating.

The embodiment represented in FIGS. 3 to 5 differs from the one represented in FIGS. 1 and 2 by the fact that the analysis card 1 comprises "n", in this case 3, chambers 2, 3, 17 which are arranged in series but may also be arranged in parallel, and are separated in pairs by "n−1", in this case two perforable partitions 7 and 18, "n" being a whole number, and it being possible for one of the chambers 2, 3 and 17 to be, in particular, an optical measurement chamber. In order to allow an automatic process with a single laser light ray, the perforable partitions 7 and 18 are distributed in the card 1 in such a way that no two partitions can be aligned with the same incident light ray 12. As indicated above, the analysis card in FIGS. 3 to 5 includes a liquid which fills the chamber 3 and will travel into the chamber 2 after the partition 7 has been perforated, as represented in FIG. 4, then into the chamber 17, after the partition 18 has been perforated, as partially represented in FIG. 5.

As represented in FIG. 6, a device 19 for processing an analysis card 1 according to the invention comprises:

- a generator 20 of coherent light having a predetermined wavelength λ and a luminous power P, comprising a laser source and means 25 for collimating and shaping the light beam emitted by the laser source; a beam of limited power, for example 2 mW, is emitted by a visible-light pointer and superposed with the laser beam in order to guide it;
- optical means 29 for coupling the quasi-parallel light beam, in order to inject it into an optical fiber 21, or optical guide means such as a prism or lens, with high efficiency;
- optical means 30 for collimating and/or shaping the beam, making it possible to obtain a circular spot of determined diameter and power density on the work surface where the penetration is to be made, lying on or in each partition 7 or 18;

means 51 for positioning the analysis card 1 in a plane perpendicular to the reference direction 6, so that the incidence of the light ray 12 illuminating each perforable partition 7 or 18 is substantially perpendicular to each said partition; these positioning means 51 displace the analysis card into two substantially perpendicular reference directions 22 and 23.

By way of example, the generator 20 emits light at 800 nm, with guide light at 670 nm. The power of the light source formed in this way is 700 mW, for an actually used power of the order of 300 mW. The optical fiber 21 which is used is a multimode fiber having a core diameter of 200 μm. At the exit of the optical fiber 21, a lens 30 makes it possible to focus the light energy on the center 13, lying on or in each partition 7 or 18.

With the following conditions:

partition 7 or 18 made of polystyrene, with a thickness of 0.3 mm;

external walls 15 and 16 made of polypropylene, silicone or germanium, using a thickness of from 2 to 7⁄10th of millimeter for a polypropylene film;

a coherent-light generator 20, as described above;

no liquid being present in the chambers 2 and 3 and cavities 8 and 9;

it was possible to make a hole **7*a*** of diameter 0.5 mm in about two seconds.

The present invention may be implemented in various embodiments; in particular, one of the chambers, with which communication is established according to the invention, may itself communicate with the atmosphere or the medium in which the analysis card is situated.

We claim:

1. An analysis card (1), in which two chambers (2, 3), which are isolated from one another, are formed, characterized in that the two chambers are separated from one another by a perforable partition (7) which is arranged within said card and is made of energy absorbant materials capable of absorbing light energy having at least a predetermined wavelength λ to convert it into heat energy which can at least locally remove said material, wherein two cavities (8, 9) are formed on either side of the partition (7) and are respectively in communication with or contained in the two chambers (2, 3) respectively, a window (10, 11) made of a material which is transparent at least to the wavelength λ is arranged facing said partition (7) and defines therewith one (8) of said cavities, referred to as the incident light ray (12) cavity.

2. An analysis card according to claim 1, characterized in that another window (11), made of a material which is transparent at least to the wavelength λ, facing said partition (7), defines therewith the other (9) of said cavities, referred to as the emergent light ray cavity.

3. An analysis card according to claim 1, characterized in that it comprises a body (14) in which the two chambers (2, 3) and the two cavities (8, 9) are embossed or etched and at least one external wall (15, 16) which closes off said chambers and cavities from the outside.

4. An analysis card according to claim 3, of substantially flattened shape, characterized in that it comprises a flat body (14) between two external walls (15, 16).

5. An analysis card according to claim 3, characterized in that one (2) of the chambers and the cavity (8) which corresponds to it are closed off by one (15) of the external walls, and the other chamber (3) and the other cavity (9) which corresponds to it, are closed off by another of said external walls (16).

6. An analysis card according to claim 3, characterized in that the perforable partition (7) is formed in the body (14), the constituent material of which absorbs light energy of wavelength λ.

7. An analysis card according to claim 3, characterized in that the window (10) is formed in the external wall (15), the constituent material of which is transparent to the wavelength λ.

8. An analysis card according to claim 1, characterized in that it comprises n chambers (2, 3, 17) which are arranged in series and/or parallel and are separated in pairs by n−1 perforable partitions (7, 18), "n" being a whole number, and one of the chambers being an optical measurement chamber, said perforable partitions being distributed in said card in such a way that no two partitions can be aligned with the same incident light beam (12).

9. An analysis card according to claim 1, in which at least one chamber (3) is filled with a liquid.

* * * * *